Figure 1:
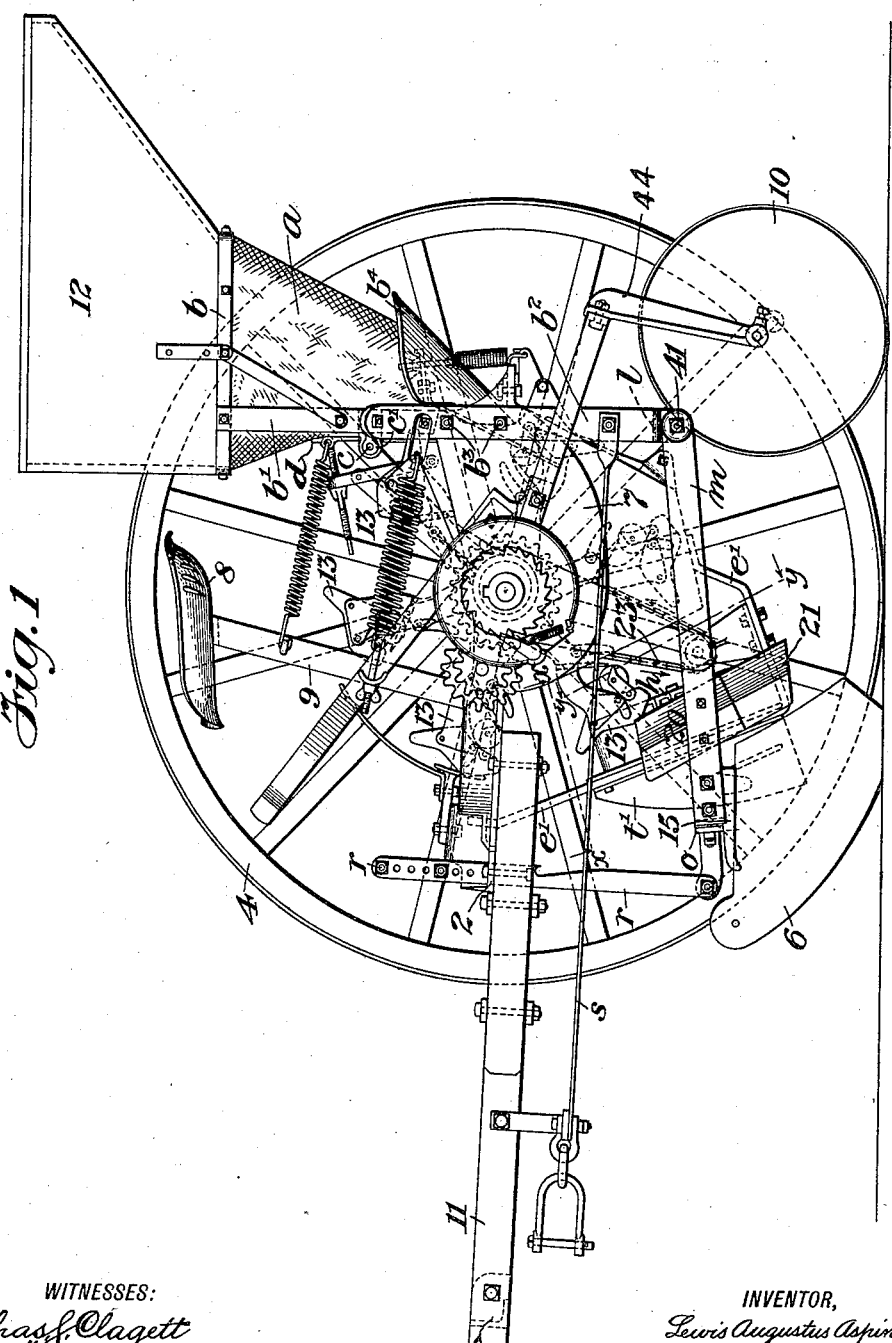

L. A. ASPINWALL.
POTATO PLANTER.
APPLICATION FILED FEB. 17, 1912.

1,059,810.

Patented Apr. 22, 1913.

3 SHEETS—SHEET 1.

WITNESSES:
Chas. F. Clagett
Geo. J. Pinckney

INVENTOR,
Lewis Augustus Aspinwall
BY Terrell & Son
HIS ATTORNEYS.

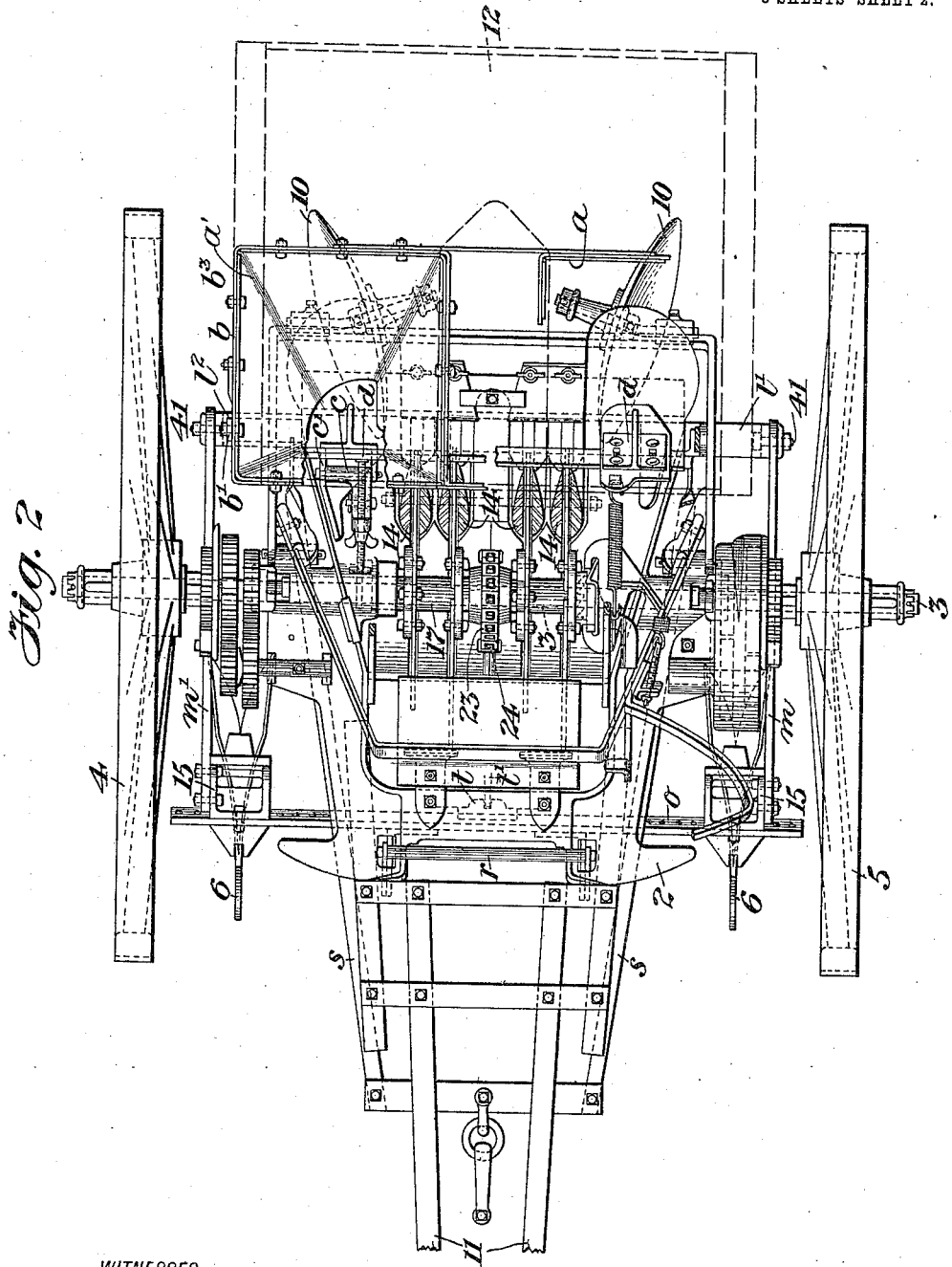

L. A. ASPINWALL.
POTATO PLANTER.
APPLICATION FILED FEB. 17, 1912.
1,059,810.
Patented Apr. 22, 1913.
3 SHEETS—SHEET 3.
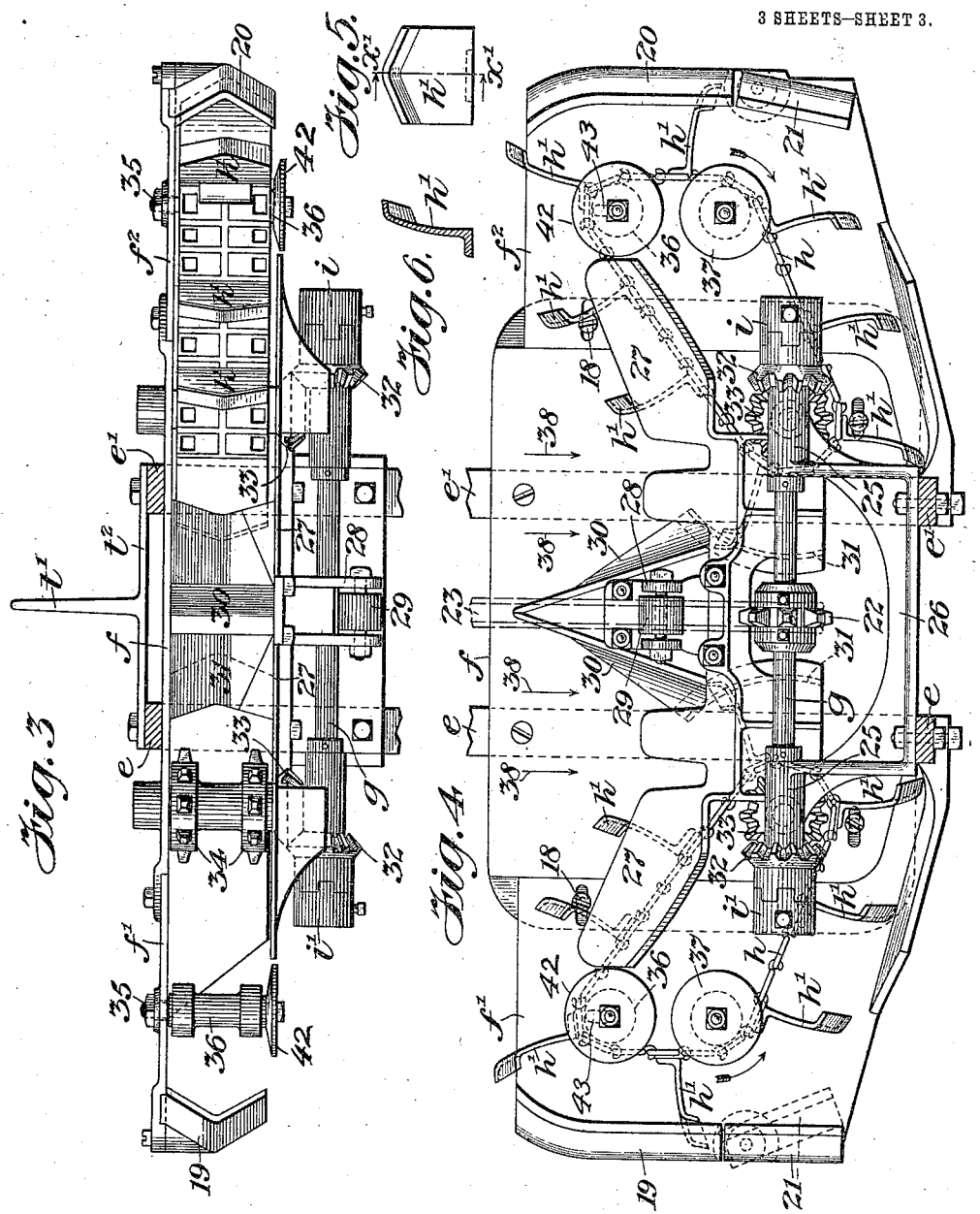
WITNESSES:
Chas. J. Clagett
Geo. H. Pinckney
INVENTOR,
Lewis Augustus Aspinwall
BY Terrell & Son
HIS ATTORNEYS.

UNITED STATES PATENT OFFICE.

LEWIS AUGUSTUS ASPINWALL, OF JACKSON, MICHIGAN, ASSIGNOR TO ASPINWALL MANUFACTURING COMPANY, OF JACKSON, MICHIGAN, A CORPORATION OF MICHIGAN.

POTATO-PLANTER.

1,059,810.   Specification of Letters Patent.   Patented Apr. 22, 1913.

Application filed February 17, 1912. Serial No. 678,320.

*To all whom it may concern:*

Be it known that I, LEWIS AUGUSTUS ASPINWALL, a citizen of the United States, residing at Jackson, in the county of Jackson and State of Michigan, have invented an Improvement in Potato-Planters, of which the following is a specification.

My present invention relates to improvements upon the potato planting devices, shown and described in various Letters Patent heretofore granted to me, and particularly to the devices shown and described in my Letters Patent No. 864,595, dated August 27, 1907.

The object of my present invention is to increase the efficiency of the structures heretofore employed by me, particularly with reference to making the potato planter adaptable for planting two parallel rows of potatoes simultaneously, and thus capable of performing double work, and the double row feature made adaptable for different widths of planting as required for different localities.

In the structure of my present invention, and in combination with the essential devices heretofore employed by me in machines of my aforesaid patent, I employ two series of devices simultaneously operative for planting two parallel rows of potatoes at the same time, and in which devices the concaves are contained in a single magazine, including a hopper adapted for discharging the potatoes into the concaves of the magazine from which they are taken up by the pickers—moving through the single magazine—, and delivered to two laterally positioned and operative delivery devices in connection with which adjustable deflector plates guide the potatoes into the furrows, previously made by companion furrow openers. These furrow openers are adjustable, as are also the laterally operative delivery devices, so as to obtain the desired distance between the rows.

In the drawing, Figure 1 is an elevation at the left hand side of my improved potato planter, with the left wheel removed. Fig. 2 is a plan, with parts of the mechanism and the hoppers, in part, broken away. Fig. 3 is a sectional plan, approximately on the broken line $x\ x$ of Fig. 1. Fig. 4 is a rear elevation, approximately on the broken line $y\ y$ of Fig. 1. Figs. 3 and 4 show the magazine conveyer from the rear of the machine, and for clearness, in Fig. 3 I have removed from one side the endless link conveyer and the attachments connected therewith. Fig. 5 is an elevation, and Fig. 6 is a central section on the broken line $x^1\ x^1$ of Fig. 5.

Similar letters and numerals of reference indicate similar parts in all figures.

There are parts which are illustrated, particularly in Figs. 1 and 2, and which are necessary to the full understanding of the potato planter, but which form no essential part of the present improvement, being similar to what I have heretofore shown in my aforesaid patents, and particularly in Patent No. 864,595. These relate to the frame 2, the main axle 3, the wheels 4 and 5, mounted on the ends of the main axle, plows or furrow openers 6, a magazine 7, into which the potatoes descend by gravity from the center hopper, and which magazine is supported from a frame, and by the sleeves 17, which surround the main axle. A seat 8, for the driver, is also shown supported upon a seat standard 9 secured to the frame of the machine. The coverers at the rear of the potato planter are shown at 10, and their function is to deliver the soil, over the potatoes as deposited in the furrow, made by the furrow openers, said coverers forming a ridge of earth over the potatoes as planted. The divided pole is shown at 11, as in my aforesaid patent, and 13 are the pickers, and 14 the concaves in which the pickers take up, on their prongs, the potatoes to be planted.

The special feature of my present invention consists of two series of devices simultaneously operative for planting two rows of potatoes at the same time, these rows being parallel and at either side of the longitudinal center of the machine. Parts of these devices are placed across the machine, and the devices thereon are laterally operative so as to move the potatoes away from the longitudinal center of the machine, equally to either side, receiving the potatoes from the pickers and dropping the same into furrows made by the furrow openers. These devices are adjustable and coact with two furrow openers, also adjustable and specially positioned and supported, so as to provide furrows for receiving the potatoes directly beneath the places of delivery by the delivery devices.

Referring particularly to Figs. 1, 3 and 4,

I employ frame bars $e$ $e^1$. These are secured at their upper ends to the front of the machine frame, and at their lower ends, to the under side of the frame of the machine, and these frame bars, at the lower part, are substantially L-shaped and inclined rearwardly. A plate $f$, slightly inclined, is connected to these bars, and the upright edges of this plate $f$ are offset, and auxiliary plates $f^1$ $f^2$ are connected to the upright offset edges of the plate $f$ by screws 18. The plates $f^1$ $f^2$ have flanged returned edges 19 and 20, the lower portions of which, at 21, are pivoted and provided with any suitable means for holding them in their position of adjustment, so as to deliver the potatoes, as they pass these adjustable parts, into the furrows made by the furrow openers 6. Through the adjustment of the furrow openers and these lower plates, 21 I provide for four different widths between the rows. For different localities where greater or less distances are required, wider or narrower auxiliary plates are used with conveyer length according. I provide a shaft $g$, and a sprocket 22 thereon, and a chain 23 passes around this sprocket and around a sprocket 24 on the main axle 3, whereby power and rotation are communicated from the main axle to the shaft $g$. This shaft $g$ is mounted in bearings 25, these bearings being connected to a U-shaped frame 26, in turn secured to the nearly horizontal parts of the frame bars $e$ $e^1$ and in a plane parallel, but spaced away from the plane of the frame $f$. A plate formation 27, occupies a nearly vertical plane or a plane parallel with the plate $f$, and is bolted to the inclined plates 30. Between the inclined plates is mounted a roller 29, the connection being preferably adjustable. The inclined plates 30 are substantially of inverted V-shape, but are curved where they rest against the plate $f$, the apex or center coming to the central portion of the plate $f$, between the bars $e$ $e^1$, there being also further inclined plates 31 which form substantial prolongations of the plates 30 and come between the part 27 and the face of the plate $f$. At the ends of the shaft $g$ are bevel gears 32, which mesh with corresponding bevel gears 33, the latter however being mounted upon short shafts that extend between and through the plates 27 and $f$, and on these short shafts are also mounted the companion sprockets 34. Studs 35, secured to the auxiliary plates $f^1$ $f^2$, support rollers 36, which are provided with disk edges 42 and which are preferably vertically adjustable in slots 43 in these auxiliary plates, as will appear particularly by reference to Fig. 4. Other rollers, with disk ends are shown at 37, and around the sprockets 34, rollers 36 and 37, at each side of the center of this device, are endless conveyers $h$. These conveyers are preferably made up of special plate belting with right and left plate projections upon the surface of which are secured the rising pusher plates $h^1$, shown particularly in Figs. 5 and 6. The rollers 36 and 37 are so spaced from the flanged edges 19 and 20, as to move into said edges and sweep through the same in dropping the potatoes into the furrows with the movement of said conveyers, which is in the direction of the arrows shown in Fig. 4. These pusher plates also move adjacent to the center of this device, up within the inclined plates 31, which are preferably curved, and said conveyers work from the center outward laterally, or across the machine. The inside rows of pickers 13 deliver the potatoes at opposite sides of the apex of the inclined plates 30, so that the potatoes fall thereon and downward upon the conveyer belts $h$ and against the pusher plates $h^1$, as the same come up from their lowest position. The outer rows of pickers drop directly between the pusher plates, being in a direct discharge angle with the spaces between the plates, while the inside rows of pickers must deflect the potatoes to deliver them between the next pusher plate spaces. The plate $f$ and the plate member 27, at either side, form guides or ways between which the potatoes move upward and outward on the conveyer belts $h$, and as said conveyer belts move over on the rollers 36, the potatoes fall onto the back of the preceding plates beneath, and as these plates come away from the flanged edges 19 and 20 and 21, the potatoes drop into the furrows. The parts are so timed that the potatoes are delivered from the pickers between the plates $h^1$, as they rise through or within the inclined plates 31, so that it is quite impossible for any potatoes to drop through between one conveyer or pusher plate and the next, as the same rise from the lower position.

The arrows 38, Fig. 4, indicate the lines of movement of the various pickers (which are in two series of two each) and delivery of the potatoes. These arrows stand over and point to notches in the plate 27, the purpose of which is to allow the pickers to pass through on their return to the magazine containing the concaves. The parts of the special made belt conveyer $h$, that is the plate portions, are like the leaves of a hinge, continued in line and formed endless with surface ribs or projections, the conveyer or pusher plates $h^1$ being connected in any suitable manner to the face of these plate projections. These plate portions of the endless conveyer are indicated in Fig. 3, at the righthand side and are of slotted openwork construction. This is done for the double purpose of loosening the weight of the structure, and also permitting any earth to sift through. The roller 29 is adapted to bear upon the chain 23, as the same passes around the sprocket 22 of the shaft $g$ and the centrally disposed sprocket 24 on the main axle sleeve, so as to keep this chain reasonably taut. Fig. 4, at the dotted or broken lines 23, indicates a chain. The lateral adjustments, hereinbefore referred to, and the auxiliary plates $f^1 f^2$, (which are of different widths to suit different localities) are used. When a change is made one conveyer plate and intervening links are removed or added as required. When the machines are sent out to work they are set at the width most prevalent, but they can be changed if the rows are too wide apart or close together. The rollers 36 provide in their adjustment for applying tension to the endless conveyers or chains, so that there is no unnecessary or lost motion. These endless conveyers must necessarily be set, so as to be in time with the movement of the pickers, to receive the potatoes at the proper time of discharge, or in other words, to receive the potatoes while there is a conveyer or pusher plate coming up through the inclined plates 31, whereby no gap exists for the potatoes to fall through. These plates are set in any desired manner. In order to time these parts, I employ couplings $i$ $i^1$ on the respective ends of the shaft $g$, and outside of the bevel gears 32, which couplings are held to the shafts by tap bolts. There are twelve teeth on the bevel gears 32 and the couplings $i$ $i^1$ are made with ten points that interlock. The ends of the shaft $g$ are provided with flat faces, as depressions against which the tap bolts for setting up the couplings bear. By holding the coupling with the set screw over the flat portion of the shaft and moving the conveyer until the position is right for receiving the potatoes from the pickers, and then turning the bevel gear, having the locking spaces or clutch end until in position to mesh with the corresponding teeth of the couplings $i$ $i^1$, these parts may be secured in any adjustable position. With the ten spaces in the clutches or couplings $i$ $i^1$ and twelve teeth in the gears, a revolution will bring them in correct alinement when they can be secured by the set screw bearing against the flattened surface of the shaft.

Referring particularly to Figs. 1 and 2, $s$ represents draft bars, to the forward ends of which the pulling devices for the animals is to be connected. The rear ends of these draft bars are pivotally connected to the vertical frame members $b^1$ $b^2$. The location of this draft attachment serves to equalize the draft, eliminating the weight which would otherwise be upon the horses' necks. It will be noticed that this draft device is pivoted to the upright frame members $b^1$ $b^2$, not only below the main frame, but below a point of considerable weight. In pulling the machine, the draft thereon has a lifting tendency, which overcomes the downward resistance, both of the weight and the furrow openers as the same are in operation, and the pressure is not upon the animals so much, in pulling the machine when in operation, as it is upon the axle and wheels, where it belongs. There are also parts shown in Figs. 1 and 2 and which are necessary to a complete operative machine and to the understanding of the same and which form the subject matter of divisional and co-pending applications herewith: These parts are the following:—The hoppers $a$ $a^1$ of flexible material, and the hopper 12 superimposed thereon, the said hoppers being connected to the frame members $b$, $b^1$ and $b^2$ by the bolts indicated at $b^3$, the lower ends of the hoppers $a$ $a^1$ coming within the flanged prolongations $b^4$ of the magazine or receiving hopper 7: also the bearings $c^1$ for the rocker bar $c$ of the gates $d$ $d$ for controlling the flow of the potatoes; also the cross bar $l$ and the side bars $m$ $m^1$, which latter are connected to the upright frame members $b^1$ $b^2$ at the pivotal points indicated by 41; also the front bar $o$ and heads 15 for the furrow openers 6, the heads 15 being preferably carried by the front bar $o$ and suitably secured to the side bars $m$ $m^1$; also the segment plate $t^1$ connected to the frame members $e^1$, and the notched plate $t$ secured to the front bar $o$, the segment plate $t^1$ engaging the notched portion of the plate $t$ to prevent any lateral movement of the furrow openers 6; and also the covers 10 and their supporting frames 44 which are connected to and are carried by the main frame of the machine.

The unitary hopper and flexible material hoppers above the concaves, the furrow openers and devices for supporting and making the same adjustable; the coverers and devices for supporting and moving and making the same adjustable, and the picker devices have all been made the subjects of separate and co-pending applications herewith having been divided therefrom.

I claim as my invention:

1. The combination in a potato planter with a single magazine, and series of pickers and concaves, of two alined oppositely moving endless conveyers, conveyer or pusher plates mounted thereon at spaced distances apart, means for supporting and other means for moving said endless conveyer devices across the machine whereby the potatoes are delivered in two separate furrows.

2. In a potato planter, the combination with devices for receiving and pickers for removing the potatoes for delivery, of devices occupying a lateral position across the center of the potato planter, series of devices for receiving the potatoes from the pickers and conveying the same laterally from the center toward the sides of the machine and furrow openers providing furrows beneath the places of delivery of the potatoes.

3. The combination in a potato planter with a supporting frame, a receiving hopper, concaves into which the potatoes pass from the hoppers, pickers for raising the potatoes one at a time, and means for delivering the said potatoes from the pickers, of two series of devices simultaneously operative and moving in opposite directions, for conveying the potatoes as delivered from the pickers and delivering the same into two separate and independent rows.

4. The combination in a potato planter with a supporting frame, a receiving hopper, concaves into which the potatoes pass from the hopper, pickers for raising the potatoes one at a time, and means for delivering the said potatoes from the pickers, of two series of devices simultaneously operative and moving in opposite directions, for conveying the potatoes as delivered from the pickers and delivering the same into two separate and independent rows, and means for adjusting said series of devices for different widths of rows, whereby the potatoes may be delivered closer together or farther apart.

5. The combination in a potato planter with a supporting frame, a receiving hopper, concaves into which the potatoes pass from the hoppers, pickers for raising the potatoes one at a time, and means for delivering the said potatoes from the pickers, of two series of devices simultaneously operative and moving in opposite directions, for conveying the potatoes as delivered from the pickers and delivering the same into two separate and independent rows, and means for adjusting said series of devices for different widths of rows, whereby the potatoes may be delivered closer together or farther apart, two furrow openers, a supporting frame therefor, and means for adjusting said furrow openers to the desired width of the rows of potatoes, whereby furrows are provided into which the potatoes, as dropped, are delivered.

6. The combination in a potato planter with the bent frame bars $e$ $e^1$, of a plate having offset vertically disposed edges and connected to said bars, auxiliary plates, occupying the same general plane as the aforesaid plate, coming at opposite sides of said plate with edges received in the offset edges thereof, and means for connecting the said auxiliary plates to the first aforesaid plate, flanged edges constituting guides formed with the said auxiliary plates, two oppositely moving conveyer devices associated with the aforesaid plates, means for supporting said conveyer devices, also associated with said plates, and devices extending therefrom to operative connection with the power supplied by the main axle of the potato planter for operating said conveyer devices, and means for delivering potatoes to said laterally moving conveyer devices.

7. The combination in a potato planter with the bent frame bars $e$ $e^1$, of a plate having offset vertically disposed edges and connected to said bars, auxiliary plates, occupying the same general planes as the aforesaid plate, coming at opposite sides of said plate with edges received in the offset edges thereof, and means for connecting the said auxiliary plates to the first aforesaid plate, flanged edges constituting guides formed with the said auxiliary plates, a frame connected to the aforesaid frame bars and spaced apart therefrom and occupying a position at right-angles to its support, a shaft mounted in bearings in said frame, a sprocket on said shaft, a sprocket on the main shaft of the potato planter, and a chain surrounding said sprockets for communicating power and rotation, a plate formation, as a guide, whereby a laterally disposed channel is established across the machine, two endless conveyer devices occupying the channel so established, and means for mounting the same operatively with bearings in said plate and frame parts, devices connected to the said conveyers for forwarding and delivering the potatoes, picker or other devices for bringing the potatoes to and delivering the same upon the said conveyers, whereby the direction of the potatoes, as delivered from the pickers or other devices, is changed to a lateral delivery for two parallel rows.

8. The combination in a potato planter with the bent frame bars $e$ $e^1$, of a plate having offset vertically disposed edges and connected to said bars, auxiliary plates, occupying the same general plane as the aforesaid plate, coming at opposite sides of said plate with edges received in the offset edges thereof, and means for connecting the said auxiliary plates to the first aforesaid plate, flanged edges constituting guides formed with the said auxiliary plates, a frame connected to the aforesaid frame bars and spaced apart therefrom and occupying a position at right-angles to its support, a shaft mounted in bearings in said frame, a sprocket on said shaft, a sprocket on the main shaft of the potato planter, and a chain surrounding said sprockets for communicating power and rotation, a plate formation, as a guide, whereby a laterally disposed channel is established across the machine, companion sprockets mounted across said lateral channel in the said plates, bevel gears connected to said sprockets, and also upon the aforesaid shaft, rollers also mounted upon the auxiliary plate, endless conveyers moving in opposite directions and laterally from said channel between said plates and extending around the sprockets and the rollers, pusher plates mounted upon said endless conveyers, guides for the potatoes as delivered upon the conveyers, and also guide plates for the pusher plates, as they come into play, whereby the potatoes are received upon the conveyer, moved along thereon, laterally of the machine, and delivered within the flanged edges of the auxiliary plates, with the movement of the machine into two rows.

9. The combination in a potato planter with the bent frame bars $e\ e^1$, of a plate having offset vertically disposed edges and connected to said bars, auxiliary plates, occupying the same general plane as the aforesaid plates, coming at opposite sides of said plate with edges received in the offset edges thereof, and means for connecting the said auxiliary plates to the first aforesaid plate, flanged edges constituting guides formed with the said auxiliary plates, a frame connected to the aforesaid frame bars and spaced apart therefrom and occupying a position at right-angles to its support, a shaft mounted in bearings in said frame, a sprocket on said shaft, a sprocket on the main shaft of the potato planter, and a chain surrounding said sprockets for communicating power and rotation, a plate formation, as a guide, whereby a laterally disposed channel is established across the machine, companion sprockets mounted across said lateral channel, bevel gears connected to said sprockets, and also upon the aforesaid shaft, rollers also mounted upon the auxiliary plate, endless conveyers moving in opposite directions and laterally from said channel between said plates and extending around the sprockets and the rollers, pusher plates mounted upon said endless conveyers, guides for the potatoes as delivered upon the conveyers, and also guide plates for the pusher plates, as they come into play, whereby the potatoes are received upon the conveyers, moved along thereon, laterally of the machine, and delivered within the flanged edges of the auxiliary plates, with the movement of the machine into two rows, and pivot parts forming continuations of the flanged edges of the auxiliary plates, which, when adjusted, contract the delivery position of the potatoes from the endless conveyers.

10. In a potato planter, the combination with the picker devices, of two alined oppositely moving endless conveyers, pusher plates mounted thereon at spaced apart intervals, means for supporting and other means for moving said endless conveyer devices across the machine or lateral thereof, inclined plates positioned between the adjacent ends of the endless conveyers and near the center of the machine and within the boundary of which the pusher plates move as they rise to position, and inclined plates whose upper ends come to the center and may be located above the aforesaid inclined plates, and which latter plates direct the potatoes as delivered onto the endless conveyers and their pusher plates.

11. In a potato planter, the combination with a supporting frame, of oppositely disposed and moving endless conveyers for the potatoes, picker devices for delivering the potatoes thereon, a plate member forming one of the supports of said endless conveyers, a segment plate extending forward at the center of the machine, and secured to this plate, furrow openers and frame supports therefor, and a notched plate at the center of said frame supports receiving the edge of the said segment plate, whereby possible lateral movement of the furrow openers and their frame supports is obviated by the steady action and weight of the segment plate and the lateral potato conveying devices, and the frame supporting the same.

12. In a potato planter, the combination of fixed or permanently arranged seed potato holding devices, pickers for singling and removing the potatoes from the mass or collective body of seed, lateral delivering devices and laterally adjustable furrow openers and coverers.

13. The combination in a potato planter with fixed or permanently arranged hoppers and magazines, mechanism for singling and removing the potatoes therefrom and for dropping the same, of two series of devices simultaneously operative and moving in opposite directions laterally from the longitudinal center toward the sides of the machine and laterally adjustable furrow openers and coverers.

Signed by me this 5th day of February, 1912.

LEWIS AUGUSTUS ASPINWALL.

Witnesses:
 GEO. N. WHITNEY,
 J. A. PARKINSON, Jr.